June 10, 1930.  J. J. FRANK  1,762,266
VALVE
Filed March 15, 1929

INVENTOR
JOHN J. FRANK
BY *Oscar J. DeWitt*
ATTORNEY

Patented June 10, 1930

1,762,266

UNITED STATES PATENT OFFICE

JOHN J. FRANK, OF PITTSFIELD, MASSACHUSETTS

VALVE

Application filed March 15, 1929. Serial No. 347,378.

The object, construction, and operation of my improved valve are herein set forth with sufficient clearness to enable those skilled in the art to which it appertains, to make and use the same.

My invention relates to an improvement in valves and particularly to a specially constructed valve adapted to effect a tight joint to prevent leakage of fluids and gases, such as air, steam, water, and especially oils when the valve is seated.

Valves as ordinarily made, comprise a metal seat upon which rests a disc. The disc is usually made of molded composition and is inserted in a container commonly known as a disc holder or clapper, and the disc is retained in the disc holder by means of a nut usually called the "disc nut." With valves of this nature there is nothing to prevent leakage thru the main members, and frequently leakage is experienced when the fluids are of exceptionally low viscosity. Valves are also made, comprising a phenolic condensation cementing material covered with a vulcanized rubber facing adhesively and permanently secured to the outer surface of the phenolic condensation cementing material and with valves of this nature exposed to a high temperature a slow, partial vulcanizing takes place to such an extent that the disc adheres to the disc holder to such a degree which not infrequently results in damage to the disc holder or its entire loss.

In my invention I provide a tight valve which preferably consists of a valve disc having a threaded stem portion, and the whole composed of phenolic condensation cementing material, but my valve may be composed of so-called bakelite compound, celluloid, casine, moulded rubber or other mouldable compounds. My invention further consists in the novel manner of providing a valve disc in which the threaded stem portion may be of one composition, hard to withstand the threads, and the outer portion of a softer composition in order to make a tight joint if the valve is used for gases or penetrating oils at low pressure. It will be seen that I have provided a valve disc in which one portion may be composed of one material and the other portion of another material, all moulded together to form one integral part.

Referring to the accompanying drawings wherein similar characters of reference indicate corresponding parts throughout the several views.

Figure 1:
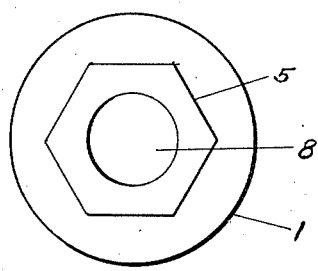
Figure 1 is a plan view.
Figure 3:
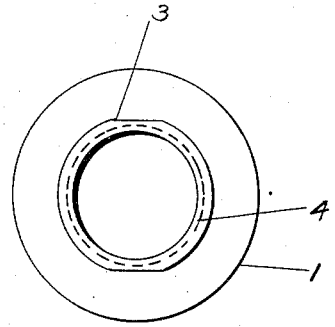
Figure 3 is a plan view with the valve stem nut removed.
Figure 4:
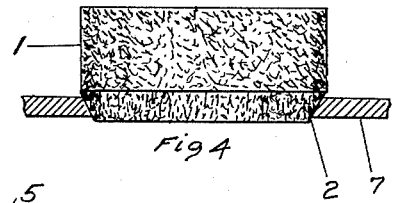
Figure 4 is an elevation view of a modified form of my valve.
Figure 2:
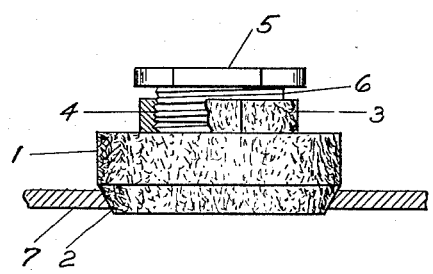
Figure 2 is an elevation view in part section.

As indicated by the numeral 1 the valve disc consists of a non-metallic and non-porous compound that may be impregnable to fluids, gas, air, water, or oils, and the disc also has the taper face 2 for the valve seat 7, shown in Figure 2. The upper portion of the valve disc 1 is provided with a threaded stem 3 and the threads 4 of the threaded stem are adapted to engage with the threads 6 on the stem nut 5. The stem nut 5 is of ordinary construction provided with the hole 8.

To suit the various conditions under which the valve may be used, the valve disc 1 may be composed of some soft composition to insure a tight joint between the valve disc 1 and the seat 7 when the valve disc is used for gases or penetrating oils at low pressure, and the threaded stem portion 3 may be composed of a harder composition to withstand the pressure on the threads 4 when the stem nut 5 is threaded into the threaded stem portion 3, and the whole moulded together to form one integral piece, and if desired the disc and stem portion may consist of the same material and degree of hardness throughout.

The tendency of a valve to leak fluid is when the valve is seated, and will invariably leak when the valve disc is composed of two or more sections, and consists of a valve that uses what is termed a "disc nut." I have overcome this objectional feature by providing a valve constructed of one integral part, and as my valve may be moulded to conform to various shapes and forms I do not wish to limit myself to the exact construction, as minor changes may be made without departing from the spirit of the invention.

What I claim is:

1. A valve construction of the character described comprising a moulded non-metallic and non-porous valve disc or clapper, a moulded hollow threaded stem extending therefrom and the whole moulded together forming one integral part.

2. A valve construction of the character described comprising a moulded non-metallic and non-porous valve disc or clapper, a moulded threaded stem extending therefrom and the whole moulded together forming one integral part.

3. A valve construction of the character described comprising a moulded non-metallic and non-porous valve disc or clapper, a moulded threaded hollow stem extending therefrom, said hollow stem of a different degree of hardness than the valve disc, and the whole moulded together forming one integral part.

4. A valve construction of the character described comprising a moulded non-metallic and non-porous valve disc or clapper, a moulded threaded hollow stem extending therefrom, said hollow stem of a different degree of hardness than the valve disc, and the whole moulded together forming one integral part.

5. A valve construction of the character described comprising a moulded non-metallic and non-porous valve disc or clapper, a moulded threaded hollow stem extending therefrom, said hollow stem of a different degree of hardness than the valve disc, and the whole moulded together forming one integral part.

In testimony whereof I affix my signature.

JOHN J. FRANK.